(12) United States Patent
Ichikawa et al.

(10) Patent No.: US 6,934,640 B2
(45) Date of Patent: Aug. 23, 2005

(54) METHOD AND SYSTEM FOR COMPREHENSIVE MANAGEMENT OF CHEMICAL MATERIALS

(75) Inventors: Yoshiaki Ichikawa, Tokai (JP); Akira Sekine, Hitachiohta (JP); Takako Oono, Hitachinaka (JP); Hirotaka Satou, Hitachi (JP); Tetsuya Matsui, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 09/858,478

(22) Filed: May 17, 2001

(65) Prior Publication Data

US 2002/0004769 A1 Jan. 10, 2002

(30) Foreign Application Priority Data

May 26, 2000 (JP) ....................................... 2000-161110

(51) Int. Cl.[7] .............................................. G06F 17/60
(52) U.S. Cl. .............................. 702/31; 702/22; 702/23; 702/25; 702/30; 702/31; 702/189; 702/194
(58) Field of Search ............................... 702/22–27, 30, 702/31, 186, 187, 189, 194, 196, FOR 138, FOR 155, FOR 134–140; 705/28.9; 700/213, 214, 217, 218, 219, 14, 121; 376/216, 245, 249; 52/900; 422/105, 186.03, 186.04, 232, 233; 707/100, 101, 102, 104.1, 200

(56) References Cited

U.S. PATENT DOCUMENTS

| | | | | |
|---|---|---|---|---|
| 5,311,437 A | * | 5/1994 | Leal et al. | |
| 5,726,884 A | * | 3/1998 | Sturgeon et al. | ........... 705/9 |
| 5,812,421 A | * | 9/1998 | Fujii et al. | ........... 702/45 |
| 6,067,549 A | * | 5/2000 | Smalley et al. | ...... 707/104.1 |
| 2001/0025282 A1 | * | 9/2001 | Ohishi et al. | ......... 707/104.1 |
| 2002/0004768 A1 | * | 1/2002 | Sekine et al. | ............ 705/28 |
| 2002/0026339 A1 | * | 2/2002 | Frankland et al. | ......... 705/7 |
| 2002/0052666 A1 | * | 5/2002 | Fukatsu et al. | ......... 700/107 |
| 2002/0056638 A1 | * | 5/2002 | Ohishi et al. | ............ 204/401 |
| 2002/0069089 A1 | * | 6/2002 | Larkin et al. | ............... 705/4 |
| 2002/0099587 A1 | * | 7/2002 | Kakihana et al. | .......... 705/7 |
| 2002/0133302 A1 | * | 9/2002 | Matsui et al. | ............ 702/30 |
| 2003/0004965 A1 | * | 1/2003 | Farmer et al. | ........ 707/104.1 |

FOREIGN PATENT DOCUMENTS

| | | | |
|---|---|---|---|
| EP | 0 964 349 A2 | * 12/1999 | |
| JP | A-07-121588 | * 5/1995 | |
| JP | A-11-290832 | * 10/1999 | |
| JP | 2000029900 A | * 1/2000 | ........... G06F/17/30 |
| JP | A-2000-137747 | * 5/2000 | |
| JP | 2000137747 A | * 5/2000 | ........... G06F/17/60 |
| JP | 2002066308 A | * 3/2002 | |
| WO | WO 98/11493 | * 3/1998 | |

OTHER PUBLICATIONS

English Translation of "Ecology Information Systems for Circulatory Society", The Hitachi Hyoron, vol. 81, No. 12 (Dec. 1, 1999), pp. 31–34.

"Ecology Information Systems for Circulatory Society", The Hitachi Hyoron, vol. 81, No. 12 (Dec. 1, 1999), pp. 31–34.

* cited by examiner

Primary Examiner—Marc S. Hoff
Assistant Examiner—Carol S Tsai
(74) Attorney, Agent, or Firm—Dickstein Shapiro Morin & Oshinsky LLP

(57) ABSTRACT

The present invention provides a method and system for management of chemical materials comprising the steps of providing a first data set containing which substances comprise the materials, providing a second data set containing which of the substances are to be controlled, providing a third data set containing a ratio of discharge of the controlled substances in a process, analyzing a preset amount of the materials in the process and determining a quantity of the controlled substances utilizing the first and second data sets, determining an emissions quantity of the controlled substances utilizing the ratio and the quantity of the controlled substances and maintaining the third data set according to a preset interval of time.

39 Claims, 12 Drawing Sheets

FIG. 2(a)

DATABASE OF MATERIAL COMPOSITION 104

| [NAME OF MATERIAL] ××RAW MATERIAL | | |
|---|---|---|
| CAS REGISTRY NUMBER | COMPONENT OF COMPOSITION | COMPOSITION |
| 7439-97-6 | MERCURY | 5~10% |
| 75-01-4 | VINYL CHLORIDE | 40~50% |

FIG. 2(b)

DATABASE OF SUBSTANCES UNDER CONTROL 105

| CAS REGISTRY NUMBER | NAME OF SUBSTANCE | KEI-DANREN | INDUSTRIAL ASSOCIATION (A) |
|---|---|---|---|
| 557-20-0 | DIETHYL ZINC | | ○ |
| 79-06-1 | ACRYLAMIDE | ○ | ○ |

DATA OF PHYSICAL PROPERTIES: MOLECULAR WEIGHT 71.1/VAPOR PRESSURE/MELTING POINT 84.5°C/ SOLUBILITY IN WATER/BOILING POINT 87°C/SPECIFIC GRAVITY

FIG. 2(c)

DATABASE OF EMISSION FACTOR 106

| PROCESS | SUBSTANCE FED | SUBSTANCE DISCHARGED | POINT OF DISCHARGE AND TRANSFER | EMISSION FACTOR |
|---|---|---|---|---|
| SECTION A, CLEANING | XYLENE | XYLENE | ATMOSPHERE | 0.001 |
| SECTION A, CLEANING | XYLENE | XYLENE | WASTE | 0.3 |
| SECTION A, CLEANING | METHYLENE CHLORIDE | METHYLENE CHLORIDE | WATERS | 0.001 |
| SECTION B, ASSEMBLING | METHYLENE CHLORIDE | DIOXIN | WASTE | 0.9 |

FIG. 2(d)

MSDS DATABASE

[NAME OF SUBSTANCE] ZINC OXIDE 102

CHEMICAL NAME: ZINC WHITE
ENGLISH NAME: ZINC WHITE
CAS REGISTRY NUMBER: 1314-13-2
PROPERTIES

RAW MATERIAL, PRICE
PRODUCTION METHOD, APPLICATIONS
PRODUCTION, PRECAUTIONS
PACKAGE, TOXICITY
(APPLICABLE REGULATIONS)

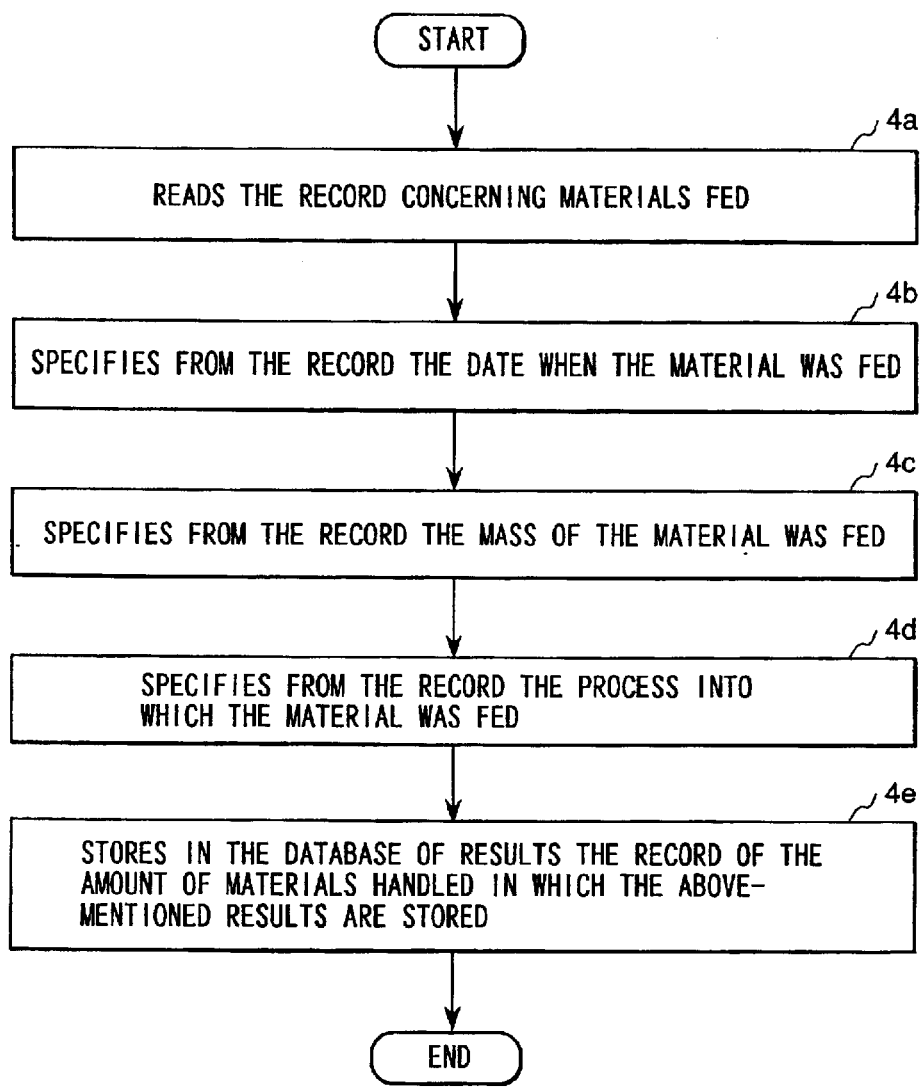

| PROCESS | SUBSTANCE UNDER CONTROL | MASS PURCHASED | DATE |

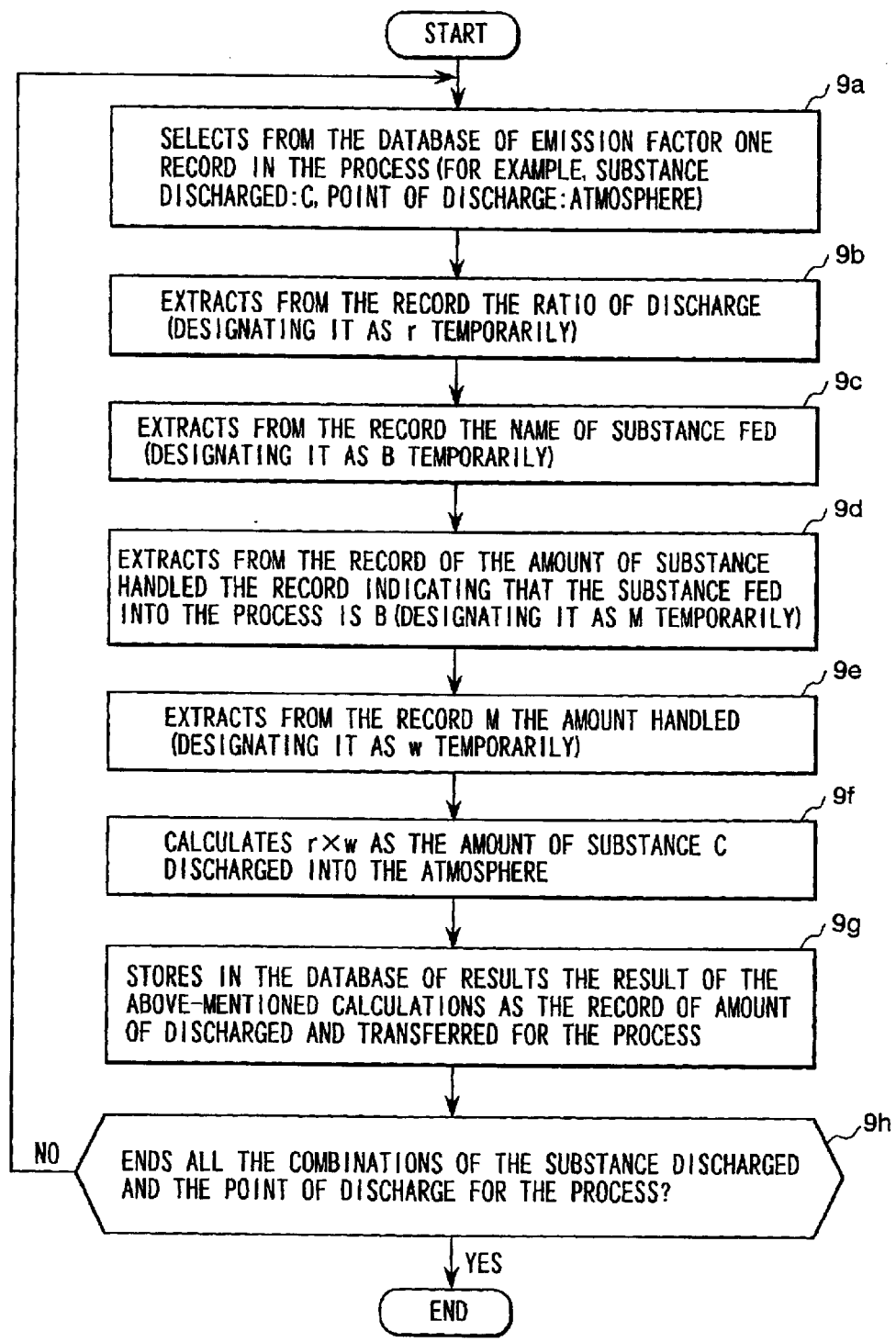

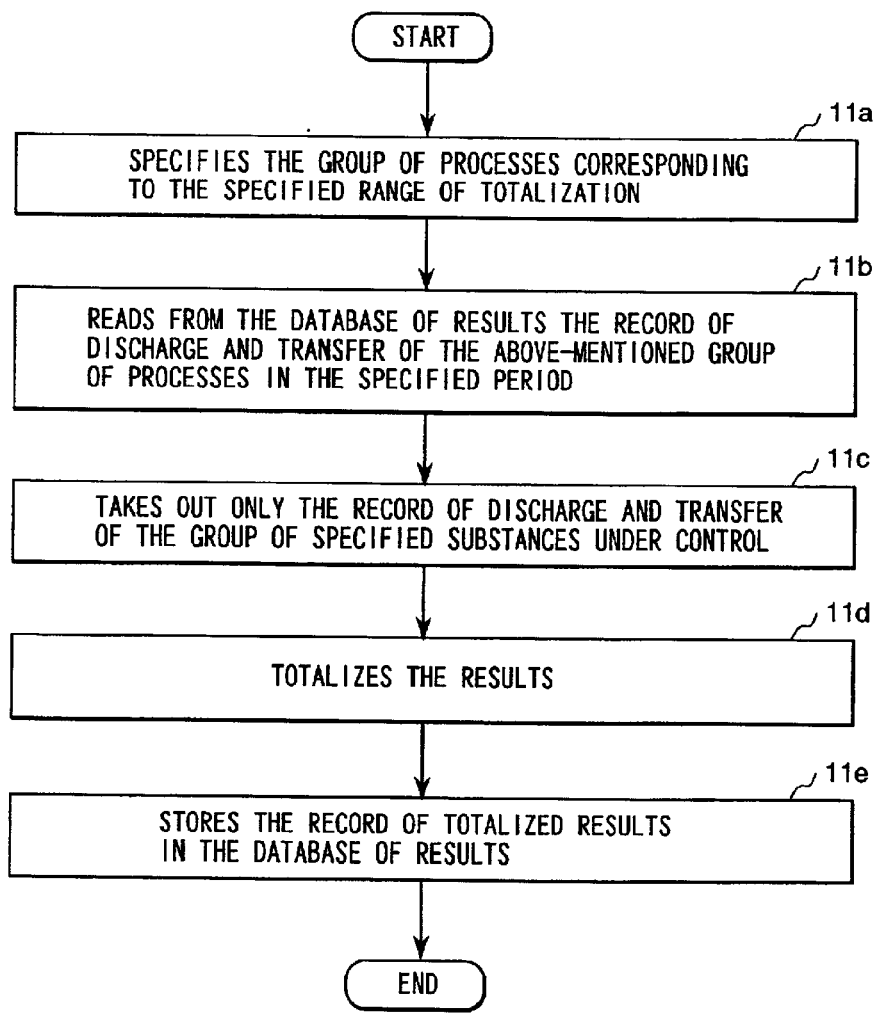

| ORGANIZATION | SUBSTANCE UNDER CONTROL | POINT OF DISCHARGE AND TRANSFER | AMOUNT OF DISCHARGE AND TRANSFER |

FIG. 14(a)

SCREEN DISPLAYING LIST OF EMISSION FACTORS

| PROCESS | SUBSTANCE FED | SUBSTANCE DISCHARGED | POINT OF DISCHARGE | FACTOR |
|---|---|---|---|---|
| SECTION A, CLEANING | XYLENE | XYLENE | ATMOSPHERE | 0.001 |
| SECTION A, CLEANING | XYLENE | XYLENE | WASTE | 0.3 |
| SECTION A, CLEANING | METHYLENE CHLORIDE | METHYLENE CHLORIDE | WATERS | 0.001 |
| SECTION B, ASSEMBLING | METHYLENE CHLORIDE | DIOXIN | WASTE | 0.9 |

FIG. 14(b)

SCREEN OF EMISSION FACTOR MAINTENANCE  (RENEW)

NAME OF WORKING SITE:
NAME OF JOB SITE: PRODUCTION TEAM 2
PROCESS: DEVELOPMENT WITH α-XYLENE
NAME OF PRODUCT: OMR DEVELOPMENT SOLUTION
MAINTENANCE OF DISTRIBUTION COEFFICIENT WILL BE PERFORMED

---

INPUT
NAME OF SUBSTANCE: XYLENES (MISTURE)
DISCHARGE: CHIMNEY FOR DISCHARGE INTO ATMOSPHERE, POINT SOURCE

OUTPUT:
NAME OF SUBSTANCE: [ ]  [SELECTION OF SUBSTANCE NAME]

DISTRIBUTION COEFFICIENT: [30] %
REPORT: [YES ▼] %
METHOD OF CALCULATION: [B: MATERIAL BALANCE, ▼] CALCULATION OF CHEMICAL INDUSTRY

METHOD AND SYSTEM FOR COMPREHENSIVE MANAGEMENT OF CHEMICAL MATERIALS

FIELD OF THE INVENTION

The present invention relates to a method and system for comprehensive management of chemical materials, in particular, a method and system for comprehensive management of chemical materials utilizing a database of an emission factor.

DISCUSSION OF THE RELATED ART

Currently, a large variety of chemical materials are on the market containing hundreds of chemical substances. These chemical substances that are discharged into the atmosphere, soil, and water during the process of production, distribution, and storage of certain chemical substances are hazardous to the environment. Further, chemical substances that are contained in and transferred together with final products or in wastes that are discarded can be hazardous to the environment as well (the amount of chemical substances discharged and transferred are referred to as "amount discharged and transferred" hereinafter).

Therefore, companies which handle these chemical materials are required by law to report to the state or local public entities quantitative data regarding discharge and transfer of certain hazardous substances in their factories and premises. This requirement is intended to estimate the total environmental load throughout the country. Therefore, companies are required to manage the chemical substances they independently handle (those chemical substances which are managed or controlled by companies are referred to as "substances under control" hereinafter).

The amount of chemical substances discharged and transferred is estimated by means of an "emission factor" which is a numerical value indicating the ratio of the amount of chemical substances discharged and transferred to the amount of chemical substances handled in each individual process. For example, an emission factor of 1% for benzene for a particular process means that one ton of benzene is discharged into the atmosphere when 100 tons of benzene is used in that process.

Conventionally, a system for management of chemical materials only contains basic data on substances under control for individual processes. In other words, the conventional system only contains data or information that is required legally. For example, the guidelines for preparing such a disclosure document is described in the issue (December 1999) of "Kankyo Shigen." Thus, the conventional technology discussed above is unable to calculate the amount of chemical substances discharged and transferred if the substance produced is new or a new chemical material is utilized in the manufacturing process.

SUMMARY OF THE INVENTION

The present invention provides a method and system for comprehensive management of chemical materials utilizing a database of an emission factor that is maintained according to a preset interval of time.

In an object of the invention a method for management of chemical materials is provided comprising the steps of providing a first data set containing which substances comprise the materials, providing a second data set containing which of the substances are to be controlled and providing a third data set containing a ratio of discharge of the controlled substances in a process. The method further provides analyzing a preset amount of the materials in the process and determining a quantity of the controlled substances utilizing the first and second data set, determining an emissions quantity of the controlled substances utilizing the ratio and the quantity of the controlled substances and maintaining the third data set according to a preset interval of time.

In another object of the present invention a method for management of chemical materials is provided comprising the steps of providing a first data set containing which substances comprise the materials, providing a second data set containing which of the substances are to be controlled, providing a third data set containing a ratio of discharge of the controlled substances in a process and providing a fourth data set containing handling precautions, hazards and legal regulations for the materials. The method further provides the steps of analyzing a preset amount of the materials in the process and determining a quantity of the controlled substances utilizing the first and second data sets, determining an emissions quantity of the controlled substances utilizing the ratio and the quantity of the controlled substances and maintaining the third data set according to a preset interval of time.

In yet another object of the present invention a method for management of chemical materials is provided comprising the steps of providing a first data set containing which substances comprise the materials, providing a second data set containing which of the substances are to be controlled and providing a third data set containing a ratio of discharge of the controlled substances in a process. The method further provides the steps of analyzing a preset amount of the materials in the process and determining a quantity of the controlled substances utilizing the first and second data sets and determining an emissions quantity of the controlled substances utilizing the ratio and the quantity of the controlled substances.

In yet another embodiment of the present invention a system for management of chemical materials is provided comprising a server, comprising, a first data set containing which substances comprise the materials, a second data set containing which of the substances are to be controlled and a third data set containing a ratio of discharge of the controlled substances in a process. The server is in communication with a processor, the processor, in turn, is programmed to analyze a preset amount of the materials in the process and determining a quantity of the controlled substances utilizing the first and second data sets, determine an emissions quantity of the controlled substances utilizing the ratio and the quantity of the controlled substances and maintain the third set data according to a preset interval of time.

In another embodiment of the present invention a system for management of chemical materials is provided comprising a server, comprising, a first data set containing which substances comprise the materials, a second data set containing which of the substances are to be controlled, a third data set containing a ratio of discharge of the controlled substances in a process and a fourth data set containing handling precautions, hazards and legal regulations for the materials. The server is in communication with a processor, the processor, in turn, is programmed to analyze a preset amount of the materials in the process and determining a quantity of the controlled substances utilizing the first and second data sets, determine an emissions quantity of the controlled substances utilizing the ratio and the quantity of the controlled substances and maintain the third set data according to a preset interval of time.

In yet another embodiment of the present invention, a system for management of chemical materials is provided comprising a server, comprising, a first data set containing which substances comprise the materials, a second data set containing which of the substances are to be controlled and a third data set containing a ratio of discharge of the controlled substances in a process. The server is in communication with a processor, the processor, in turn, is programmed to analyze a preset amount of the materials in the process and determine a quantity of the controlled substances utilizing the first and second data sets and determine an emissions quantity of the controlled substances utilizing the ratio and the quantity of the controlled substances.

In yet another embodiment of the present invention a system for management of chemical materials is provided comprising a first data set containing which substances comprise the materials, a second data set containing which of the substances are to be controlled and a third data set containing a ratio of discharge of the controlled substances in a process. The first and second data sets being utilized to analyze a preset amount of the materials in the process and determine a quantity of the controlled substances and the ratio and the quantity of the controlled substances being utilized to determine an emissions quantity of the controlled substances and the third set data being maintained according to a preset interval of time.

In yet another embodiment of the present invention, a system for management of chemical materials is provided comprising a first data set containing which substances comprise the materials, a second data set containing which of the substances are to be controlled, a third data set containing a ratio of discharge of the controlled substances in a process and a fourth data set containing handling precautions, hazards and legal regulations for the materials. The first and second data sets are utilized to analyze a preset amount of the materials in the process and determine a quantity of the controlled substances. The ratio and the quantity of the controlled substances are utilized to determine an emissions quantity of the controlled substances and the third set data is maintained according to a preset interval of time.

In yet another embodiment of the present invention a system for management of chemical materials is provided comprising a first data set containing which substances comprise the materials, a second data set containing which of the substances are to be controlled and a third data set containing a ratio of discharge of the controlled substances in a process. The first and second data sets are utilized to analyze a preset amount of the materials in the process and determine a quantity of the controlled substances and the ratio and the quantity of the controlled substances are utilized to determine an emissions quantity of the controlled substances.

In another object of the present invention a method for management of chemical materials is provided comprising the steps of providing a first data set containing substances which comprise the materials and providing a second data set containing substances which are to be controlled. Also, the method provides the step of providing a third data set containing a ratio of discharge of the controlled substances in a process, wherein a fed substance and a discharged substance in the process are stored in the third data set and the discharged substance includes the controlled substance different from the fed substance and generated in the process analyzing a preset amount of the materials in the process and determining a quantity of the controlled substances utilizing the first and second data set. The method includes the step of determining an emissions quantity of the controlled substances utilizing the ratio and the quantity of the controlled substances.

BRIEF DESCRIPTION OF THE DRAWINGS

The above advantages and features of the invention will be more clearly understood from the following detailed description which is provided in connection with the accompanying drawings.

FIGS. 2(a) through 2(d) illustrate examples of the data structure of each database in the system for comprehensive management of chemical substances in one embodiment of the present invention;

FIG. 4 is a flow diagram of data entry processing in one embodiment of the present invention;

FIG. 5 is an example of the format of record concerning the amount of material handled in one embodiment of the present invention;

FIG. 9 is a flow diagram of estimating and totalizing processing in one embodiment of the present invention;

FIG. 10 is an example of the format of record concerning the amount of process discharge and transfer in one embodiment of the present invention;

FIG. 11 is a flow diagram of overall totalizing process in one embodiment of the present invention;

FIGS. 14(a) and 14(b) illustrate examples of screens displaying input in the system for comprehensive management of chemical substances in one embodiment of the present invention;

DETAILED DESCRIPTION OF THE INVENTION

Figure 1:
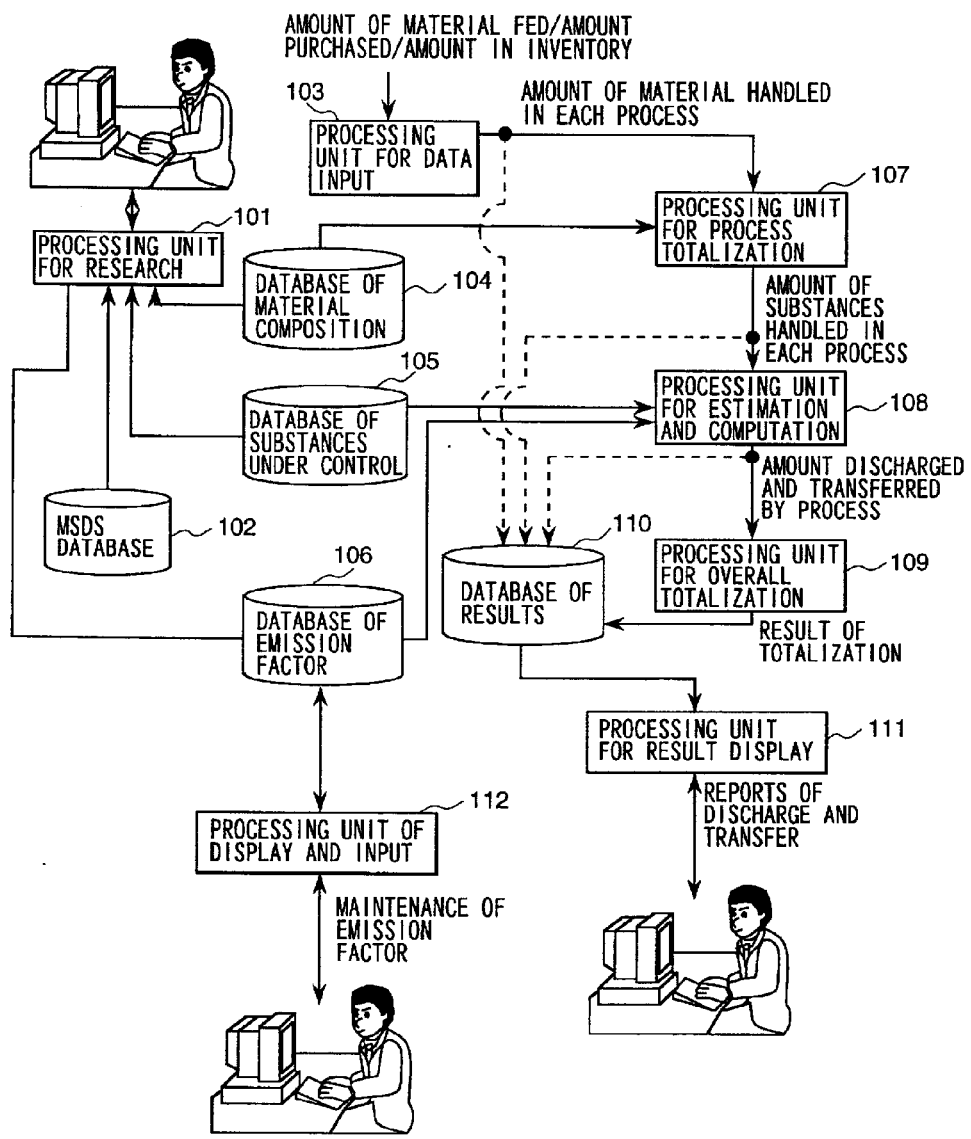
FIG. 1 is a diagram showing the construction of the system for comprehensive management of chemical substances in one embodiment of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to the drawings, FIG. 1 is a diagram showing the construction of the system for comprehensive management of chemical substances in one embodiment of the present invention.

The system for comprehensive control of chemical substances consists of a processing unit for search 101, an MSDS database 102, a processing unit for data input 103, a database containing material composition 104, a database containing substances under control 105, a database regarding emission factor 106, a processing unit for process totalization 107, a processing unit for estimation and computation 108, a processing unit for overall totalization 109, a database regarding results 110, a processing unit for results display 111, and a processing unit for display and input 112.

The MSDS database 102 is a collection of Material Safety Data Sheets (MSDS) describing handling precautions, hazardousness, and legal regulations for individual materials. The term "materials" means any raw material which is made into finished products or which is used for production of finished products, the former including unprocessed products (such as ores and crude oil), primary products (such as steel sheets), and semiprocessed products (such as substrates), and the latter including coating agents, detergents, paints, and coolants. The term "finished products" means any product which is shipped as manufactured goods by companies. Examples include automobiles, cameras, personal computers, films, TV sets, CPUs, boards, cables, clothing, foods, buildings, electricity, water, etc.

The database regarding material composition 104 is a collection of data on compositions of materials. Any one material is usually composed of a plurality of substances or molecules. Any substance or molecule is identified by a Chemical Abstracts Service (CAS) registry number. The records in the database regarding material composition 104 should preferably be organized such that each field contains the name of material, the identifier of substance under control contained in the material (for example, the name of substance under control and the CAS registry number of the substance under control), and the upper and lower limits of content (preferably mass percent) of the substance under control. The substances under control embrace those chemical substances (specified chemical substances of first kind) which are regulated by the law for Pollutant Release and Transfer Registers (PRTR). They also embrace chemical substances regulated by the chemical substance control guide and the environmental preservation guide issued by the local governments. They are those substances which seriously affect the environment or which need control. Examples include toluene, xylene, methyl isobutyl ketone, isopropanol, lead chromate, epoxy resin, methylene chloride, benzene, diethyl zinc, acrylamide, mercury, and vinyl chloride.

The database regarding substances under control 105 is a list of substances under control. It stores records each containing as fields the type of substances under control (such as poisonous substances, deleterious substances, objects of control, substances designated by regulations, and substances under voluntary control) and the identifier of such substances under control. Moreover, it also stores records each containing as fields the identifier and physical properties of the substances under control. The physical properties include factors for conversion from molecular weight into pure metal mass and values of vapor pressure, density, etc.

The database regarding emission factor 106 stores records each containing as fields the substance under control for individual destinations of discharge and transfer (such as atmosphere, waters, soil, consumption, disposal by contract, recycling, and production) and the amount of discharge and transfer of the substance under control (preferably in terms of ratio by weight) for individual processes and combination of materials handled in each process. The term "process" means the production process of products, the inspection process of products, and the development process of products which are carried out by the company. Their examples include molding process, fabricating process, heat-treatment process, coating process, cleaning process, etching process, surface-treatment process, and assembling process.

The processing unit for search 101 functions to retrieve necessary data from records in the MSDS database 102, the database regarding material composition 104, the database regarding substances under control 105, and the database regarding emission factor 106 by means of fields relating to one another, to retrieve necessary date by means of the name of substance under control or the CAS registry number, or to retrieve necessary data from texts in the field by means of partial match. It also functions to output the retrieved result to the display or file.

The database regarding results 110 stores those records which are utilized by or generated by the processing unit for data input 103, the processing unit for process totalization 107, the processing unit for estimation and computation 108, and the processing unit for overall totalization 109. Such records include those concerning the amount of material handled, the amount of substance handled, the amount discharged and transferred, and the amount totalized.

The processing unit for results display 111 retrieves and reads the contents of the database regarding results 110 and displays the totalized results. For example, it associates with one another and displays the name of substances under control, the CAS registry number of the substances under control, the amount of the substances under control discharged and transferred at individual points of discharge and transfer, and the total amount of the substances under control discharged and transferred at individual points of discharge and transfer. It also associates with one another and displays the name of substances under control, the CAS registry number of the substances under control, the department which handled the substance under control, the process which processed the material containing the substance under control, and the amount of the substances under control which was handled in one year.

The processing unit for display and input 112 provides the ability of a user interface to display and write the contents of the database regarding emission factor 106. In other words, the database of emission factor 106 is updated or maintained at some set interval of time such that the database 106 contains the most recent information regarding chemical materials and substances in various processes. In one embodiment, the database 106 can be maintained manually. Also, the set interval of time may be flexible to accommodate the current integrity of the database 106. In other words, the database 106 can be maintained as necessary when new chemical substances, in certain processes, are discovered or found. In this way, a comprehensive method and system for the management of chemical materials can be provided by calculating the amount of a chemical substance discharged and transferred even if it is new or if a new chemical material is utilized in the manufacturing process.

The system for comprehensive control of chemical substances as one embodiment of the present invention is executed by programs stored in a recording medium (such as floppy disk, hard disk, memory card, memory stick, MO, PD, CD-ROM, CD-R/RW, DVD-ROM, and DVD-RAM). The programs control the processing unit for data input 103, the processing unit for process totalization 107, the processing unit for estimation and computation 108, the processing unit for overall totalization 109, and the processing unit for results display 111.

The system for comprehensive control of chemical substances as one embodiment of the present invention employs databases stored in a recording medium (such as floppy disk, hard disk, memory card, memory stick, MO, PD, CD-ROM, CD-R/RW, DVD-ROM, and DVD-RAM). These recording media contain the MSDS database 102, the database regarding material composition 104, the database regarding substances under control 105, the database regarding emission factor 106, and the database regarding results 110 (such as records of the amount of materials handled, records of the amount of substances handled, records of the amount discharged and transferred, and records of totalized results).

FIG. 2 is a diagram showing an example of the data structure of each database in the system for comprehensive control of chemical substances in one embodiment of the present invention.

FIG. 2(a) shows an example of data structure of the database regarding material composition 104. This database stores, using the material name as the key index, the CAS registry number and composition substances of the substance under control contained in the material and the upper and lower limits (preferably in terms of wt %) of composition, for each material. The material name is the trade name on the market or the product number assigned by the purchasing department. Any coding system may be used so long as it permits each item to be uniquely identified.

FIG. 2(b) shows an example of data structure of the database regarding substances under control 105. This database stores, using the CAS registry number of the substance under control as the key index, the substance under control, the association which designates the substance under control, and the physical date of the substance under control, which are related with one another. The physical data includes the molecular weight, melting point, boiling point, vapor pressure, water solubility, and specific gravity of the substance under control.

FIG. 2(c) shows an example of a data structure of the database regarding emission factor 106. This database stores, using the company's process as the key index, the kind of the substance handled by the process, the kind of the substance discharged and transferred from the process, the point of discharge and transfer, and the emission factor, which are related to one another. The emission factor is a ratio of the amount of substance discharged to the amount of substance introduced into the process.

FIG. 2(d) shows an example of the data structure of the MSDS database. The MSDS database stores, using the substances under control or the materials as the key index, data concerning the chemical name, English name, CAS registry number, properties, raw materials, price, production method, applications, production, handling precautions, package, toxicity, and applicable regulations of the substances under control.

Figure 3:
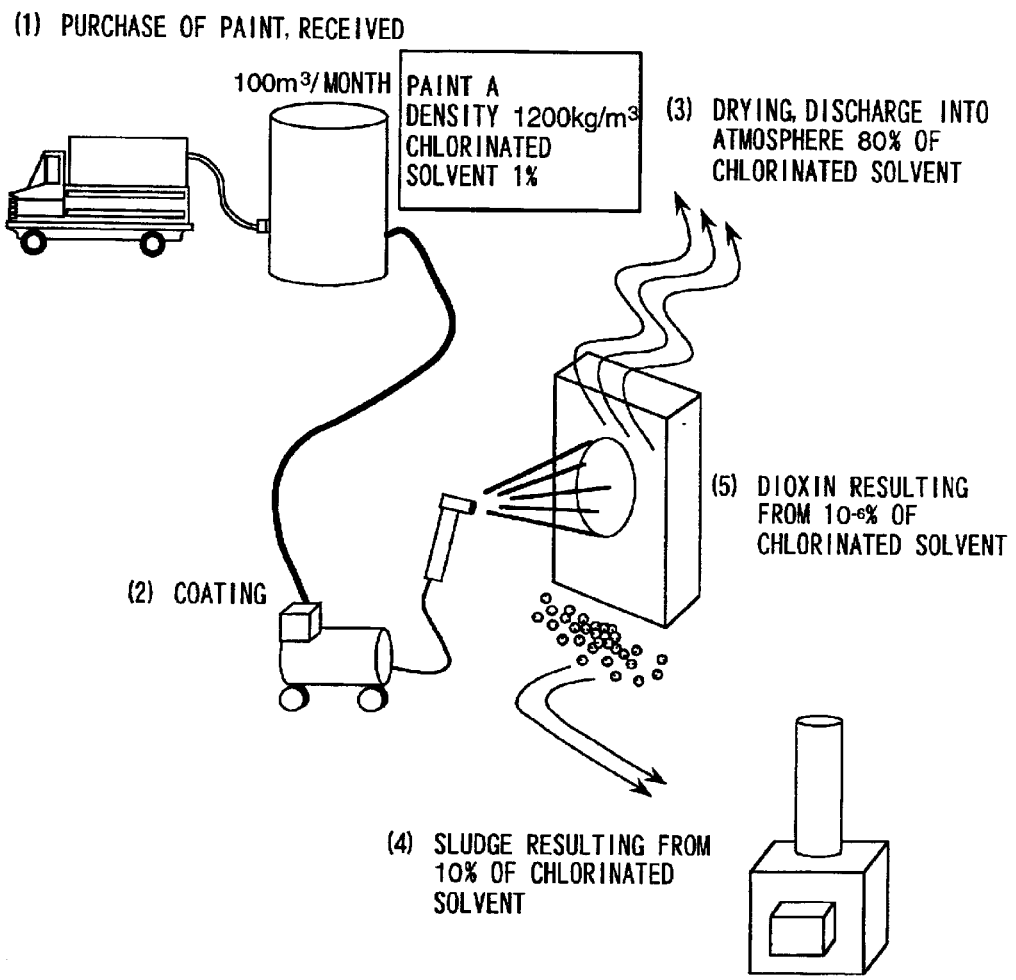
FIG. 3 is a diagram showing the handling of substances under control in one embodiment of the present invention.

FIG. 3 is a diagram showing the handling of the substance under control in one embodiment of the present invention and will be explained sequentially in their numerical order.

(1) The coating process starts with purchasing the material called "coating A." The purchase amount of coating A is 100 m³/month, and the amount of coating A in storage tank is constant. Therefore, it is assumed that the amount of coating A handled in the process is 100 m³/month. Since coating A has a density of 1200 kg/m³, the weight of coating A handled is 120,000 kg/month.

(2) All of this quantity is put in the coating process.

Calculations up to this stage are carried out by the processing unit for data input 103 as shown in FIG. 1. The information that coating A contains 1% of chlorinated solvent is read from the database regarding material composition 104 shown in FIG. 1. The result of calculations is that the coating process handles chlorinated solvent (the substance under control) in an amount of 1200 kg/month. This calculation is carried out by the processing unit for process totalization 107.

(3) In this coating process, coating A is applied by spraying to the product. Part of coating A is discharged into the atmosphere in the drying step. The fact that 80% of the chlorinated solvent is discharged into the atmosphere is read from the database regarding emission factor 106 shown in FIG. 1. It is known from this that the chlorinated solvent is discharged into the atmosphere in an amount of 960 kg/month.

The foregoing is applicable to the case in which both the substance put in and the substance discharged is the same chlorinated solvent. The situation is different when the sludge resulting from the coating process is disposed of by burning, as indicated by (4) and (5). It is assumed that sludge contains 10% (120 kg) of chlorinated solvent. It is further assumed that this chlorinated solvent generates $10^{-6}$% of dioxin after burning in the incinerator. According to the corresponding record in the database regarding emission factor 106, the emission factor is a hundred-millionth in the case where the substance put in is chlorinated solvent, the substance discharged is dioxin, and the point of discharge is atmosphere. As a result, it is estimated that dioxin is discharged into atmosphere in an amount of 1.2 mg/month. This estimation is carried out by the processing unit for estimation and computation 108 shown in FIG. 1.

FIG. 4 is a flow diagram showing the processing unit for data input 103 (shown in FIG. 1) in the system for comprehensive control of chemical substances in one embodiment of the present invention.

The processing unit for data input 103 executes the data inputting and data processing, which consists of reading 4a, date specifying 4b, mass specifying 4c, process specifying 4d, and storing 4e.

The data inputting is to read in information about the purchasing and feeding of the material from the material control records (such as material purchase books and inventory control books). An example given here demonstrates a series of processing as follows.

"Reading records 4a" to read in the result of feeding the material into the process.

"Specifying date 4b" to specify the date for conversion from the Japanese Era to the Christian Era according to the data field for year.

"Specifying mass 4c" to specify the mass of the material.

"Specifying process 4d" to specify, by utilizing the name of the orderer, the process in which the material is used.

"Storing 4e" to store the results (as the records concerning the amount handled) in the database regarding results 110.

FIG. 5 shows an example of the format for record concerning the amount of the material handled. This record consists of process, material, mass purchased, and date.

Figures 6, 7:
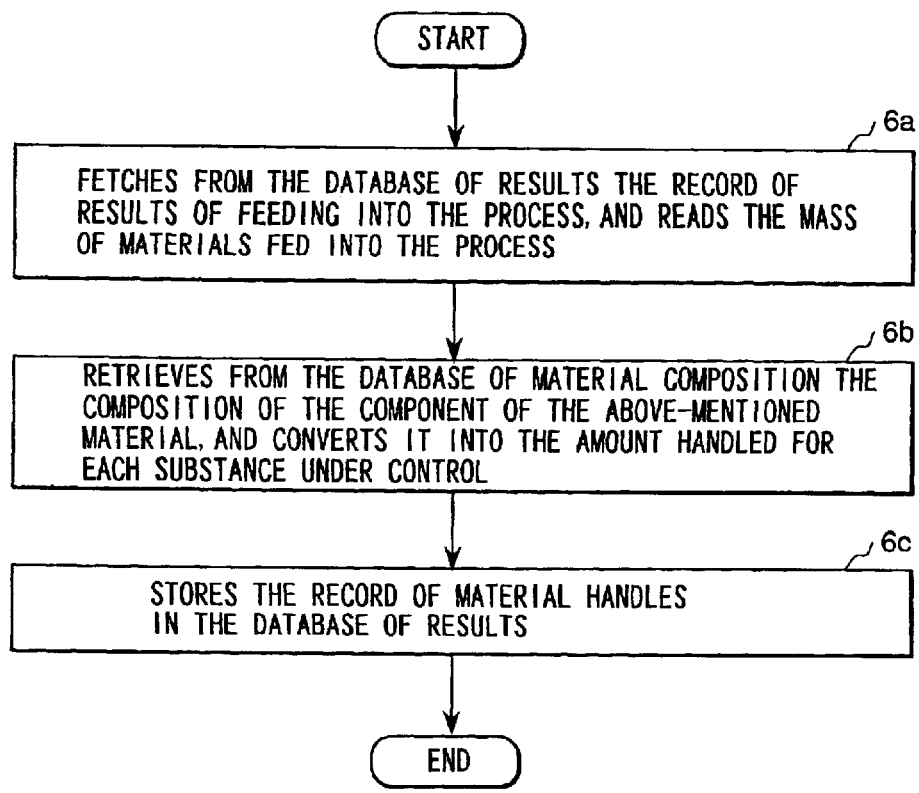
FIG. 6 is a flow diagram of process totalization processing in one embodiment of the present invention.
FIG. 7 is an example of the format of record concerning the amount of substance handled in one embodiment of the present invention.

FIG. 6 is a flow diagram showing the processing unit for process totalization 107 (shown in FIG. 1) in the system for comprehensive control of chemical substances as one embodiment of the present invention.

The processing unit for process totalization 107 executes the process totalization, which consists of reading 6a, converting 6b, and storing 6c.

The first step is "reading 6a" to retrieve or "fetch" the amount handled by the process (which is stored in the database regarding results 110) and read the mass of the material introduced into the process. The second step is "converting 6b" to retrieve the composition of the component of the material from the data stored in the database regarding material composition 104 and then converting it into the amount handled for each substance under control. If the amount of the material handled is managed in terms of mass (kg) and the ratio of content of the substance under control contained in the material is managed in terms of mass %, then the amount of the substance under control can be obtained in terms of mass (kg) by multiplying the mass (kg) of the material handled by the ratio of content of the substance under control in the material. The third step is "storing 6c" to store the records concerning the amount of the substance handled in the database regarding results 110.

FIG. 7 shows an example of the format for record concerning the amount of the substance handled. This record consists of process, substance under control, mass purchased, and date.

Figure 8:
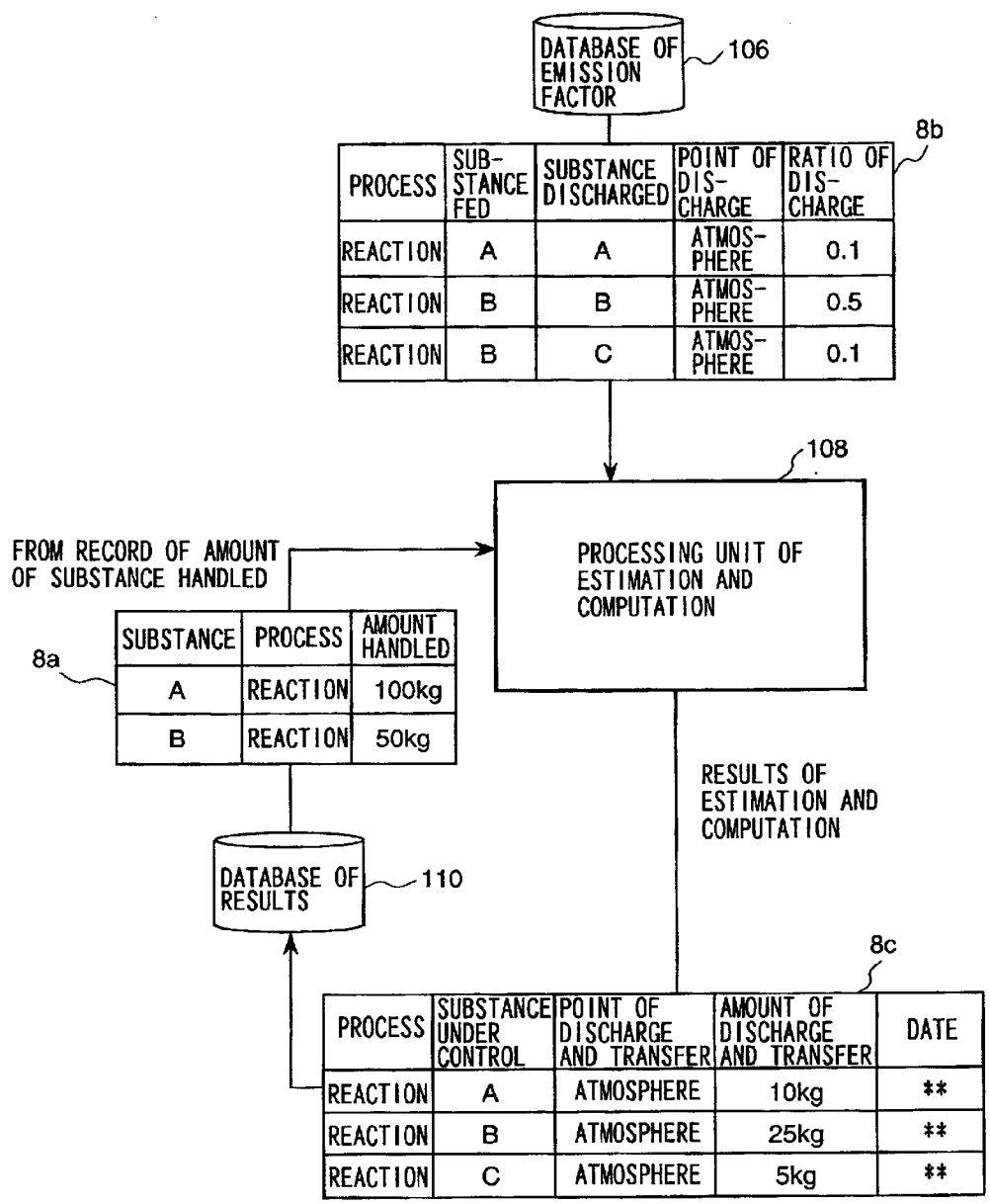
FIG. 8 is a diagram illustrating the function of estimating and totalizing processing in the system for comprehensive management of chemical substances as one embodiment of the present invention.

FIG. 8 is a diagram showing the function of estimation and totalization in the system for comprehensive management of chemical substances in one embodiment of the present invention shown in FIG. 1.

The following example demonstrates a case in which substance A and substance B are introduced into the process (called "reaction") and substance C is generated by their reaction. The records concerning the amount of substances handled show that 100 kg of substance A and 50 kg of substance B have been introduced into the process, as indicated by 8a. On the other hand, it is assumed that the database regarding emission factor 106 stores the emission factor in the process called "reaction" as indicated by 8b. This record of emission factor suggests that 10% of substance A and 50% of substance B are discharged into the atmosphere, and it also suggests that substance C is generated anew and discharged into the atmosphere and that the amount of substance C generated is determined by the amount of substance B introduced into the process and 10% of substance B introduced into the process is discharged (as substance C) into the atmosphere. The processing unit for estimation and computation 108 reads in the records 8a and 8b and calculates the amount of substances discharged.

In this example, the amount of substance A discharged is 10 kg which is equivalent to 10% of 100 kg of substance A introduced into the process, the amount of substance B discharged is 25 kg which is equivalent to 50% of 50 kg of substance B introduced into the process, and the amount of substance C discharged is 5 kg which is equivalent to 10% of 50 kg of substance B introduced into the process. As a result, a record showing the amount of substance discharged and transferred by the process is generated as indicated by 8c, and this record is stored in the database regarding results 110.

Hence, a method for management of chemical materials is provided comprising the steps of providing a first data set containing substances which comprise the materials and providing a second data set containing substances which are to be controlled and providing a third data set containing a ratio of discharge of the controlled substances in a process, wherein a fed substance and a discharged substance in the process are stored in the third data set and the discharged substance includes the controlled substance different from the fed substance and generated in the process. The method further provides the step of analyzing a preset amount of the materials in the process and determining a quantity of the controlled substances utilizing the first and second data set and determining an emissions quantity of the controlled substances utilizing the ratio and the quantity of the controlled substances.

FIG. 9 is a flow diagram showing the processing unit for estimation and computation 108 (shown in FIG. 1) in the system for comprehensive control of chemical substances in one embodiment of the present invention. This flow diagram illustrates only one process for ease of explanation. In actuality, the same processing as shown here may be performed on all the processes.

The processing unit for estimation and computation 108 estimates and totalizes the results. It consists of the steps of reading (as indicated by 9a, 9b, 9c, 9d, and 9e), calculating (as indicated by 9f), and looping (as indicated by 9h).

The first step (reading 9a) selects one set of records in the process from the emission factor records stored in the database regarding emission factor 106. It is assumed that the discharged substance having this emission factor record is substance C and it is discharged into the atmosphere.

The second step (reading 9b) extracts the factor (designated as r temporarily) of discharge and transfer of the substance under control in the process from the emission factor records.

The third step (reading 9c) extracts the name (designated as B temporarily) of the substance introduced into the process from the same emission factor records.

The fourth step (reading 9d) extracts the record (designated as record m temporarily) indicating that the substance introduced into the process is B from the records concerning the amount of substance handled which are stored in the database regarding results 110.

The fifth step (reading 9e) extracts the amount (designated as w temporarily) of substance handled from the record m.

The sixth step (calculating 9f) calculates r×w.

(r: the factor of discharge and transfer, w: the amount of substance handled). The calculated value is the amount of substance C discharged into the atmosphere by the process.

The final step (storing 9g) writes this result (as the record concerning the amount of substance discharged and transferred by the process) in the database regarding results 110.

The foregoing steps are carried out for one record of the process; therefore, they are repeated (by looping 9h) until they go through all the records.

FIG. 10 shows an example of the format of the record concerning the amount of substance discharged and transferred by the process. The record consist of process, substance under control, point of discharge and transfer, amount of discharge and transfer, and date.

FIG. 11 illustrates a flow diagram showing the processing unit for overall totalization 109 (shown in FIG. 1) in the system for comprehensive control of chemical substances as one embodiment of the present invention. The processing unit for overall totalization 109 performs the totalization. It consists of steps of the specifying the process (11a), reading (11b and 11c), totalizing (11d), and storing (11e).

The first step (11a) specifies the process group corresponding to the specified range to be totalized (e.g., work site, division, department, line, step, factory, working place, working group, and district).

The second step (11b) reads from the result database the records concerning the amount of substance discharged and transferred belonging to the above-mentioned process group in the specified period (e.g., from Apr. 1, 1999 to May 31, 1999).

The third step (11c) reads only the records concerning the amount of substance discharged and transferred of the group of specified substances under control (e.g., those substances specified by the Environment Agency).

The fourth step (11d) totalizes the records. The processing unit for search 101 specifies the range of totalization, the period, and the group of substances under control.

The final step (11e) stores the record of results of totalization in the database regarding results 110.

Figures 12, 13:
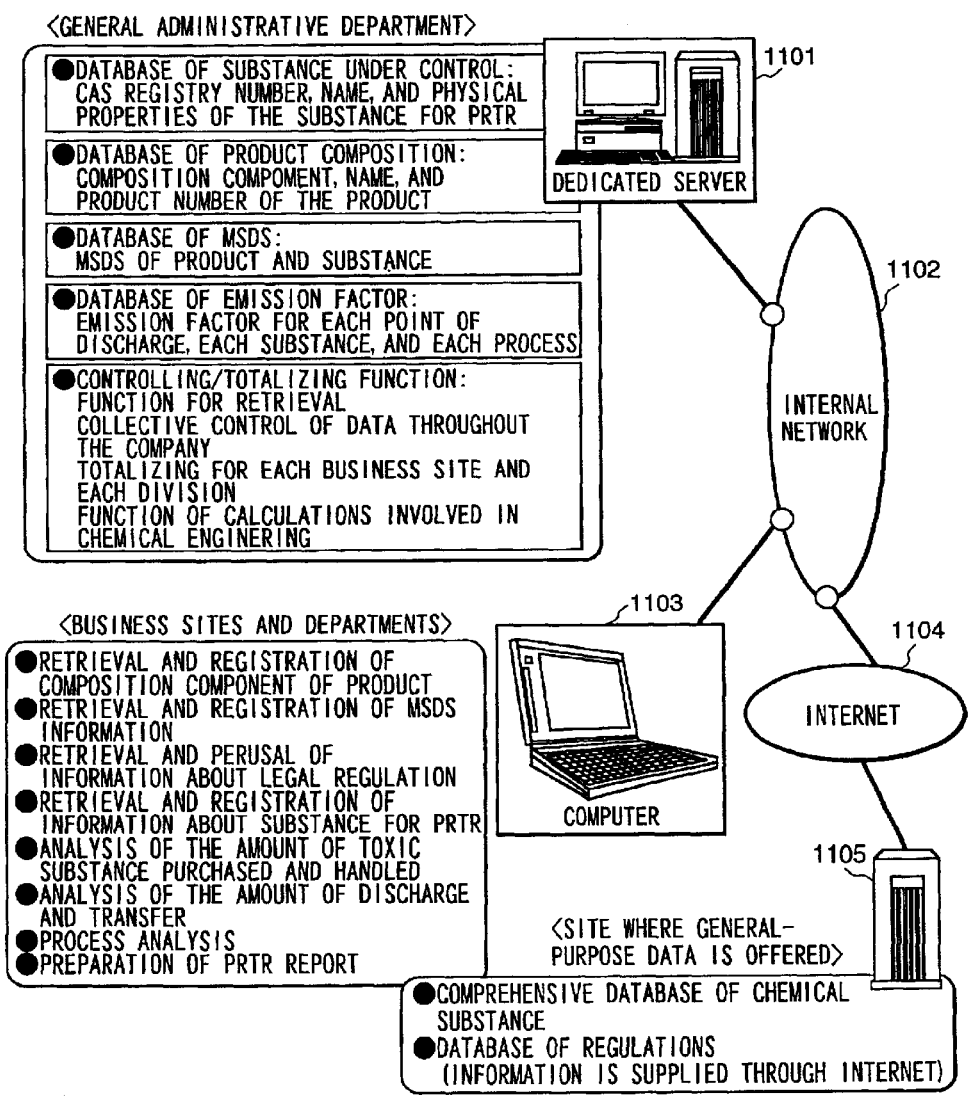
FIG. 12 is an example of the format of record concerning the totalizing record in one embodiment of the present invention.
FIG. 13 is a diagram showing the construction of the system for comprehensive mangement of chemical substances in one embodiment of the present invention.

FIG. 12 is an example of the format of the record of the results of totalization. In this case the record concerning the amount of substances discharged and transferred by the process consists of the organization, substance under control, point of discharge and transfer, and amount of discharge and transfer.

FIG. 13 is a diagram illustrating one example of the construction of the system for comprehensive control of chemical substances in one embodiment of the present invention.

A dedicated server computer 1101 is installed in the supervisory division, and it stores all of the databases and processing units shown in FIG. 1. For example, an internal network 1102 is connected to this dedicated server computer 1101 so as to make it possible to utilize all the functions by means of the computer 1103 in various departments in the factories and business sites of the company. Note, the function of the internal network 1102 may be accomplished through use of the internet as well. If the databases shown in FIG. 1 are placed in the general-purpose data supply site 1105 and then connected to it through the internet, then it is possible to utilize a broad range of data which is not entirely stored in the dedicated server computer 1101 or data which are frequently changed.

Also, it is possible to send and renew data concerning MSDS, data concerning material composition, data concerning substances under control, and data concerning emission factor to the dedicated server computer 1101 from the general-purpose data supply site 1105 through the internet 1104 and the internal network 1102.

FIG. 14 shows an example of the screen displaying input in the system for comprehensive management of chemical substances in one embodiment of the present invention.

FIG. 14(a) is a screen displaying input 1001a. It displays a list of the latest data concerning emission factor. It displays not only the substances introduced into the process but also the substances discharged from the process.

FIG. 14(b) is a second screen 1001b which appears when the screen displaying input 1001a is partly renewed or an additional input is made. This second screen has a field 100c in which the name of substance discharged is entered. It is possible to directly enter the name or CAS registry number of the substance into this field or to enter the name of substance by means of the button 1001d which permits one to search and select the name of substance previously registered in the database concerning substances under control. By pressing this button, it is possible to retrieve, by means of keywords, substances currently registered. When one of the retrieved substances is selected, the name of that substance is copied to the field 1001c.

Figure 15:
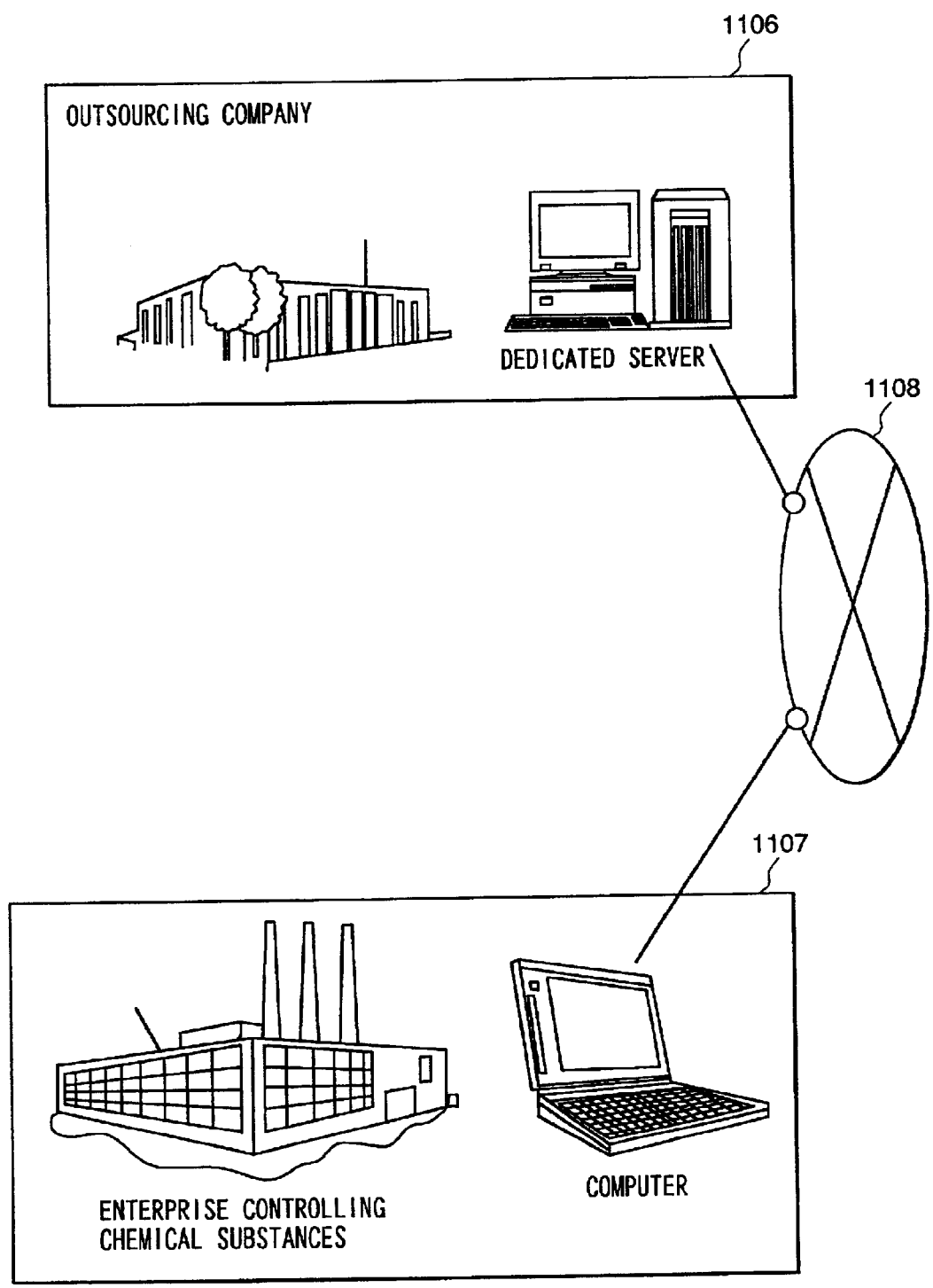
FIG. 15 is an example of the mode of business utilizing the system for comprehensive management of chemical substances in one embodiment of the present invention.

FIG. 15 shows an example of the mode of business that utilizes the system for comprehensive management of chemical substances in one embodiment of the present invention. The databases shown in FIG. 1 are placed in the dedicated server in the outsourcing company (indicated by 1106), and this server is connected to the company controlling chemical substances (indicated by 1107) through the internet (indicated by 1108). Thus the company managing chemical substances (1107) is able to calculate the amount of substances under management that are discharged and transferred by utilizing the databases stored in the dedicated server in the outsourcing company.

Also, the company controlling chemical substances (1107) calculates the amount of substances under control which are discharged and transferred by utilizing the databases stored in the dedicated server in the outsourcing company in the same way as the system for comprehensive control of chemical substances explained with reference to FIG. 1, except that the databases stored in the dedicated server of the outsourcing company are used.

Figure 16:
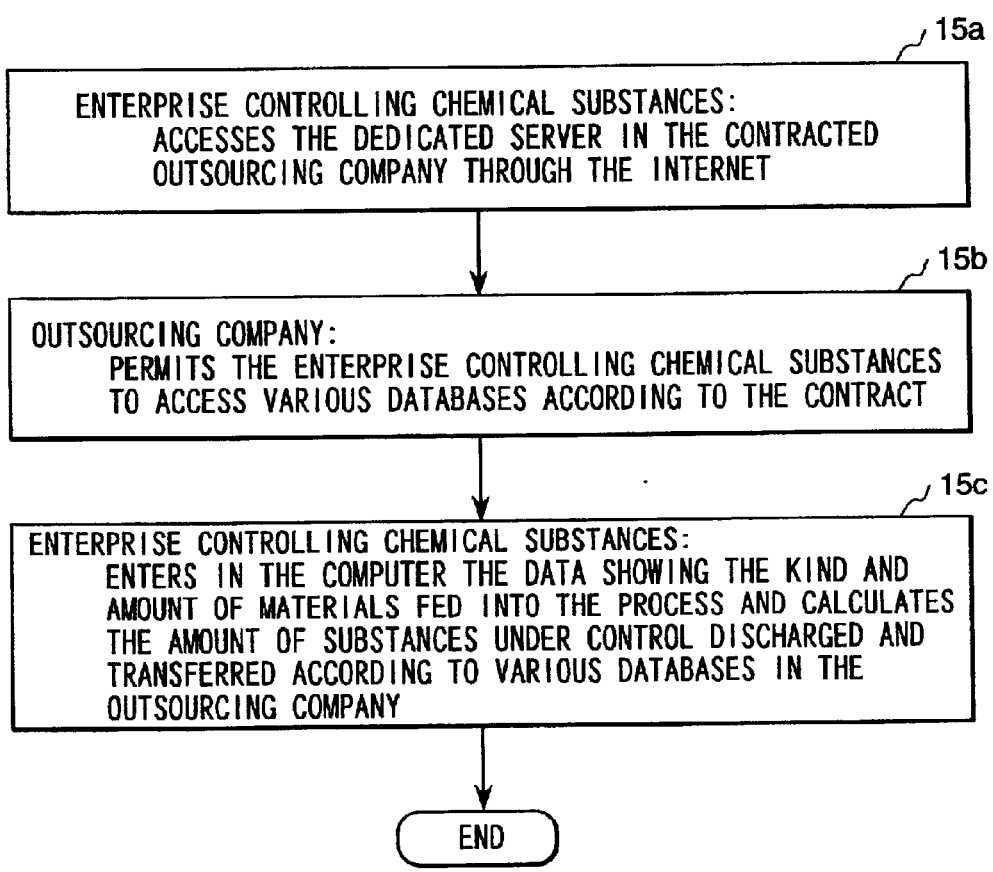
FIG. 16 is a flow diagram for execution of one example of the mode of business shown in FIG. 15.

FIG. 16 is a flow diagram for carrying out one example of the mode of business shown in FIG. 15. First, as shown in 15a, the company controlling chemical substances accesses the dedicated server of the outsourcing company through the internet (or a private line). Then, as shown in 15b, the outsourcing company permits the company controlling chemical substances to access the databases stored in the server according to the contract with the company controlling chemical substances.

Finally, as shown in 15c, the company controlling chemical substances enters in the computer the amount and kind of material to be introduced into the process and then calculates the amount of substance under control that are discharged and transferred on the basis of databases maintained by the outsourcing company.

Hence, the present invention provides a method and system for management of chemical materials comprising the steps of providing a first data set regarding which substances comprise the materials, providing a second data set regarding which of the substances are to be controlled and providing a third data set regarding a ratio of discharge of the controlled substances in a process. The method and system further provides analyzing a preset amount of the materials in the process and determining a quantity of the controlled substances utilizing the first and second data set, determining an emissions quantity of the controlled substances utilizing the ratio and the quantity of the controlled substances and maintaining the third data set according to a preset interval of time.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed is:

1. A method for management of chemical materials comprising the steps of:

provide a first data set containing substances that comprise said chemical materials, wherein said substances include controlled substances;

providing a second data set containing said controlled substances;

providing a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

analyzing a preset amount of said materials in said process and determining a quantity of said controlled substances utilizing said first and second data set;

determining an emissions quantity of said controlled substances utilizing said ratio and said quantity of said controlled substances; and maintaining said third data set according to a preset interval of time.

2. The method of claim 1 wherein said third data set further includes point of discharge and transfer information.

3. The method of claim 1 wherein said third data set further includes discharged component information.

4. The method of claim 1 wherein said process is a chemical reaction.

5. The method of claim 1 further comprising the step of providing a fourth data set containing handling precautions, hazards and legal regulations for said materials.

6. The method of claim 1 wherein said data sets are provided by an outsourcing company.

7. A method for management of chemical materials comprising the steps of:

providing a first data set containing substances that comprise said chemical materials, wherein said substances include controlled substances;

providing a second data set containing said controlled substances;

providing a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

providing a fourth data set containing handling precautions, hazards and legal regulations for said materials;

analyzing a preset amount of said materials in said process and determining a quantity of said controlled substances utilizing said first and second data sets;

determining an emissions quantity of said controlled substances utilizing said ratio and said quantity of said controlled substances; and maintaining said third data set according to a preset interval of time.

8. The method of claim 7 wherein said third data set further includes point of discharge and transfer information.

9. The method of claim 7 wherein said third data set further includes discharged component information.

10. The method of claim 7 wherein said process is a chemical reaction.

11. The method of claim 7 wherein said data sets are provided by an outsourcing company.

12. A method for management of chemical materials comprising the steps of:

providing a first data set containing substances that comprise said chemical materials, wherein said substances include controlled substances;

providing a second data set containing said controlled substances;

providing a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

analyzing a preset amount of said materials in said process and determining a quantity of said controlled substances utilizing said first and second data sets; and determining an emissions quantity of said controlled substances utilizing said ratio and said quantity of said controlled substances.

13. The method of claim 12 further comprising the step of maintaining said third data set according to a preset interval of time.

14. The method of claim 12 wherein said third data set further includes point of discharge and transfer information.

15. The method of claim 12 wherein said third data set further includes discharged component information.

16. The method of claim 12 wherein said process is a chemical reaction.

17. The method of claim 12 further comprising the step of providing a fourth data set containing handling precautions, hazards and legal regulations for said materials.

18. The method of claim 12 wherein said data sets are provided by an outsourcing company.

19. A system for management of chemical materials comprising:

a server comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

said server being in communication with a processor, said processor being programmed to:

analyze a preset amount of said materials in said process and determine a quantity of said controlled substances utilizing said first and second data sets;

determine an emissions quantity of said controlled substances utilizing said ratio and said quantity of said controlled substances; and maintain said third set of data according to a preset interval of time.

20. The system of claim 19 wherein said third data set further includes point of discharge and transfer information.

21. The system of claim 19 wherein said third data set further includes discharged component information.

22. The system of claim 19 wherein said process is a chemical reaction.

23. The system of claim 19 further comprising a fourth data set containing handling precautions, hazards and legal regulations for said materials.

24. The system of claim 19 wherein said data sets are provided by an outsourcing company.

25. A system for management of chemical materials comprising:

a server comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substances and wherein said controlled substance is different from said fed substance and said controlled substance is generated in said process;

a fourth data set containing handling precautions, hazards and legal regulations for said materials;

said server being in communication with a processor, said processor being programmed to:

analyze a preset amount of said materials in said process and determine a quantity of said controlled substances utilizing said first and second data sets;

determine an emissions quantity of said controlled substances utilizing said ratio and said quantity of said controlled substances; and maintain said third set data according to a preset interval of time.

26. The system of claim 25 wherein said third data set further includes point of discharge and transfer information.

27. The system of claim 25 wherein said third data set further includes discharged component information.

28. The system of claim 25 wherein said process is a chemical reaction.

29. The system of claim 25 wherein said data sets are provided by an outsourcing company.

30. A system for management of chemical materials comprising:

a server comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

said server being in communication with a processor, said processor being programmed to:

analyze a preset amount of said materials in said process and determine a quantity of said controlled substances utilizing said first and second data sets; and determine an emissions quantity of said controlled substances utilizing said ratio and said quantity of said controlled substances.

31. The system of claim 30 wherein said third data set further includes point of discharge and transfer information.

32. The system of claim 30 wherein said third data set further includes discharged component information.

33. The system of claim 30 wherein said process is a chemical reaction.

34. The system of claim 30 further comprising a fourth data set containing handling precautions, hazards and legal regulations for said material.

35. The system of claim 30 wherein said data sets are provided by an outsourcing company.

36. A system for management of chemical materials comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

said first and second data sets being utilized to analyze a preset amount of said materials in said process and determine a quantity of said controlled substances;

said ratio and said quantity of said controlled substances being utilized to determine an emissions quantity of said controlled substances; and said third set data being maintained according to a preset interval of time.

37. A system for management of chemical materials comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

fourth data set containing handling precautions, hazards and legal regulations for said materials;

said first and second data sets being utilized to analyze a preset amount of said materials in said process and determine a quantity of said controlled substances;

said ratio and said quantity of said controlled substances being utilized to determine an emissions quantity of said controlled substances; and said third set data being maintained according to a preset interval of time.

38. A system for management of chemical materials comprising:

a first data set containing substances that comprise said chemical materials, wherein said substances include controlled substances;

a second data set containing said controlled substances;

a third data set containing a ratio of discharge of said controlled substances in a process, wherein a fed substance and a discharged substance in the process are stored in said third data set and said discharged substance includes said controlled substances, and wherein said controlled substance is different from said fed substance and said controlled substance is generated in said process;

said first and second data sets being utilized to analyze a preset amount of said materials in said process and determine a quantity of said controlled substances; and said ratio and said quantity of said controlled substances being utilized to determine an emissions quantity of said controlled substances.

39. A method for management of chemical materials comprising the steps of:

providing a first data set containing substances that comprise said chemical materials, wherein said substances include controlled substances;

providing a second data set containing said controlled substances;

providing a third data set containing a ratio of discharge of said controlled substances in a process, wherein a fed substance and a discharged substance in the process are stored in said third data set and said discharged substance includes said controlled substance, and wherein said controlled substance is different from said fed substance and said controlled substance is generated in said process;

analyzing a preset amount of said materials in said process and determining a quantity of said controlled substances utilizing said first and second data set; and determining an emissions quantity of said controlled substances utilizing said ratio and said quantity of said controlled substances.

* * * * *